United States Patent
Ramanujam et al.

(10) Patent No.: US 7,213,039 B2
(45) Date of Patent: May 1, 2007

(54) SYNCHRONIZING DIFFERING DATA FORMATS

(75) Inventors: Srinivasan Ramanujam, Boise, ID (US); Scott A. Jeide, Meridian, ID (US)

(73) Assignee: Extended System, Inc., Boise, ID (US)

( * ) Notice: Subject to any disclaimer, the term of this patent is extended or adjusted under 35 U.S.C. 154(b) by 281 days.

(21) Appl. No.: 09/949,313

(22) Filed: Sep. 7, 2001

(65) Prior Publication Data
US 2003/0050910 A1    Mar. 13, 2003

(51) Int. Cl.
*G06F 17/00* (2006.01)

(52) U.S. Cl. .................... 707/203; 709/248

(58) Field of Classification Search .......... 707/1, 707/100, 200, 203; 709/248
See application file for complete search history.

(56) References Cited

U.S. PATENT DOCUMENTS

| | | | |
|---|---|---|---|
| 5,519,606 A | 5/1996 | Frid-Nielsen et al. | |
| 5,680,615 A * | 10/1997 | Marlin et al. | 707/103 R |
| 5,778,346 A | 7/1998 | Frid-Nielsen et al. | |
| 5,915,250 A * | 6/1999 | Jain et al. | 707/100 |
| 5,943,676 A * | 8/1999 | Boothby | 707/201 |
| 5,974,238 A * | 10/1999 | Chase, Jr. | 709/248 |
| 6,006,274 A * | 12/1999 | Hawkins et al. | 709/248 |
| 6,141,664 A * | 10/2000 | Boothby | 707/201 |
| 6,216,131 B1 | 4/2001 | Liu et al. | |
| 6,275,831 B1 | 8/2001 | Bodnar et al. | |
| 6,295,541 B1 | 9/2001 | Bodnar et al. | |
| 6,370,566 B2 * | 4/2002 | Discolo et al. | 709/206 |
| 6,401,104 B1 | 6/2002 | LaRue et al. | |
| 6,449,622 B1 | 9/2002 | LaRue et al. | |
| 6,460,051 B1 | 10/2002 | LaRue et al. | |
| 6,477,545 B1 | 11/2002 | LaRue | |
| 6,487,560 B1 | 11/2002 | LaRue et al. | |
| 6,496,835 B2 | 12/2002 | Liu et al. | |
| 6,535,892 B1 | 3/2003 | LaRue et al. | |
| 6,625,621 B2 | 9/2003 | Tan et al. | |
| 6,671,703 B2 | 12/2003 | Thompson et al. | |
| 2001/0044798 A1 * | 11/2001 | Nagral et al. | 707/102 |
| 2002/0038314 A1 | 3/2002 | Thompson et al. | |
| 2002/0055351 A1 * | 5/2002 | Elsey et al. | 455/414 |
| 2002/0062241 A1 * | 5/2002 | Rubio et al. | 705/10 |
| 2002/0133508 A1 | 9/2002 | LaRue et al. | |
| 2002/0156798 A1 | 10/2002 | LaRue et al. | |
| 2002/0194207 A1 * | 12/2002 | Bartlett et al. | 707/203 |
| 2003/0101238 A1 * | 5/2003 | Davison | 709/219 |
| 2003/0190937 A1 * | 10/2003 | Karmi et al. | 455/574 |

* cited by examiner

*Primary Examiner*—Uyen Le (57) ABSTRACT

A system and method for synchronizing records stored in differing formats in a shared data environment. One aspect of the invention involves distinguishing a record without regard to its format. Once a record is introduced into the environment, it is detected. A record tag, unique to the environment, is generated and associated with the record. When synchronizing, only those records with equivalent record tags are compared and updated.

30 Claims, 6 Drawing Sheets

SYNCHRONIZING DIFFERING DATA FORMATS

FIELD OF THE INVENTION

This invention relates to synchronizing electronic data. Specifically, this invention is directed to a method and system for synchronizing electronic data stored in differing formats.

BACKGROUND OF THE INVENTION

In today's computer networks, sharing data among devices has become desirable if not essential. Not only does the shared data need to be replicated on each device, but the set of replicated data must be synchronized so that changes made to one replica are reflected in all the others. Synchronization enables many users to work with their own local copy of shared data but have the shared data updated as if they were working on a single, centralized database. For shared data applications where users are geographically widely distributed, replication and synchronization are often the most efficient methods for effectively utilizing shared data.

In addition to desktop computers, workstations, and servers, modern computing environments often include lightweight handheld computing devices that fit into a pocket, purse, or day planner. Modern computing environments range from private networks to the Internet. Although a wide range of application programs can be executed on handheld computers, shared data applications are particularly popular and well suited for these devices. Shared data applications include, among many others, electronic calendars and task lists, electronic mail organizers, and electronic address books. A device running one or more of these applications stores electronic data that is or can be replicated and shared with other devices. It is desirable, if not essential, then to at least periodically synchronize data stored on each device. For example, many calendaring applications allow devices to share data or records concerning each user's appointments. It is important that when a new appointment is added or an existing appointment is modified on one device that addition or change is reflected on all devices providing calendaring.

Where the shared data applications on each device use the same data formats, synchronization is a relatively simple process. However, modern computing environments tend to be more complex, often having devices from multiple manufacturers, each with differing data formats making it difficult to accurately synchronize shared data. For example, where the data for one appointment is stored in one format on one device and in a second format on the other, synchronization sometimes results in the duplication of the appointment on each device.

SUMMARY OF THE INVENTION

The present invention is directed to a system and method for synchronizing records stored in differing formats in a shared data environment. One aspect of the invention involves distinguishing a record without regard to its format. Once a record is introduced into the environment, it is detected. A record tag, unique to the environment, is generated and associated with the record. When synchronizing, only those records with equivalent record tags are compared and synchronized.

DETAILED DESCRIPTION OF THE INVENTION

INTRODUCTION: In today's mobile computing environment electronic records are replicated and shared across many devices. These devices store the electronic records in any number of varying formats. It is expected that by associating each record with a unique record tag, embodiments of the present invention will allow shared records stored in differing formats to be synchronized more effectively and more efficiently.

Although the various embodiments of the invention disclosed herein will be described with reference to the shared data environment 10 shown schematically in FIG. 1, the invention is not limited to use with shared data environment 10. The invention may be implemented in or used with any electronic system in which it is necessary or desirable to synchronize shared data. The following description and the drawings illustrate only a few exemplary embodiments of the invention. Other embodiments, forms, and details may be made without departing from the spirit and scope of the invention, which is expressed in the claims that follow this description.

Figure 1:
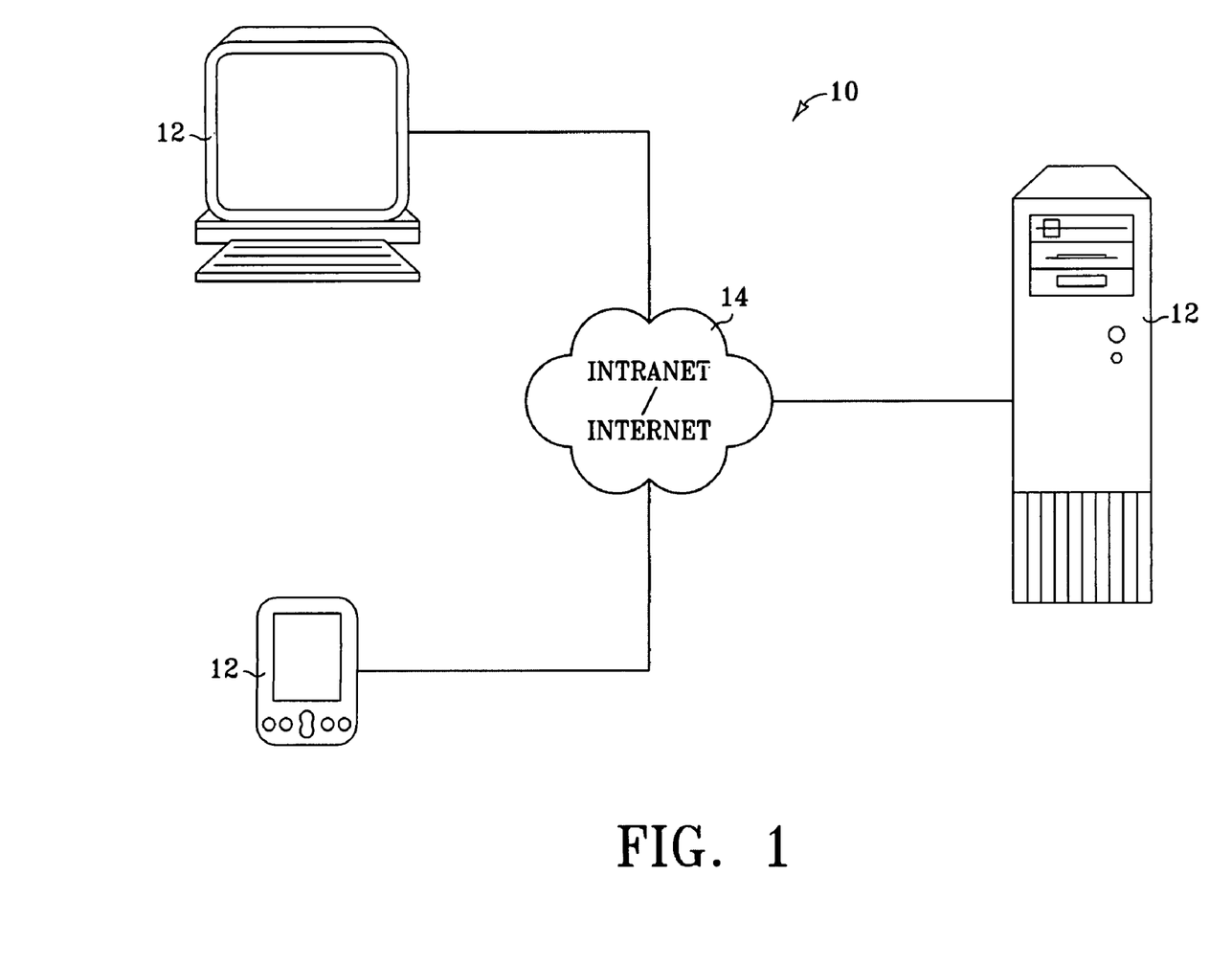
FIG. 1 is a schematic representation of a shared data environment having a personal computer, a PDA (Personal Digital Assistant) and a server.

Referring to FIG. 1, computing system 10 represents generally an environment in which a variety of electronic devices 12 are linked. Devices 12 represent electronic devices such as, but not limited to, servers, personal computer workstations, and personal digital assistants. Communication link 14 interconnects devices 12 representing generally a cable, wireless, or remote connection via a telecommunication link, an infrared link, a radio frequency link, or any other connector or system that provides electronic communication between devices 12. Communication link 14 may represent an intranet, an Internet, or a combination of both. The path followed by link 14 between devices 12 in the schematic view of FIG. 1 represents the logical communication path between these devices, not necessarily the physical path between the devices. Devices 12 can be connected at any point and the appropriate communication path established logically between the devices. While each device 12 is shown attached to shared data environment 10, any device 12 may be removed and later reconnected to link 18. This is expected to be the case for devices such as PDA'a and laptop computers.

Figure 2:
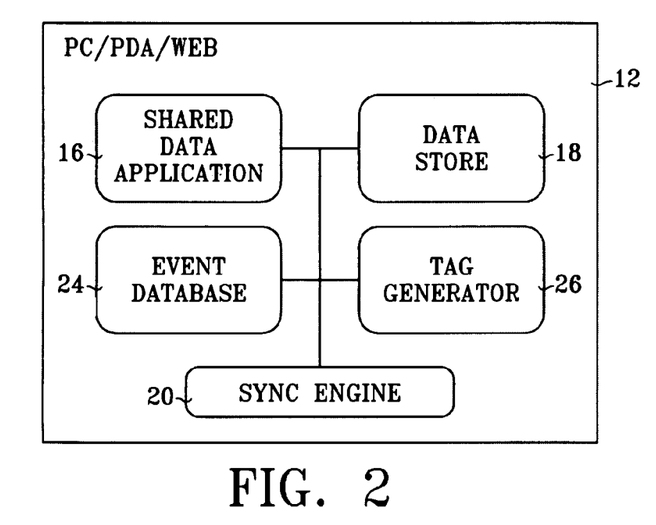
FIG. 2 is a block diagram illustrating the logical components of a device from FIG. 1.

COMPONENTS: Referring to FIG. 2, each device includes shared data application 16 and data store 18. Shared data application 16 represents generally an e-mail client, electronic calendar and task list, an electronic address book or any other application capable of sharing data. Data store 18 embodies a logical memory location for storing electronic records used by shared data application 16. Each record contained in database 18 typically represents a discrete item of shared data such as an e-mail, an appointment, a task, or an address. While FIG. 2 illustrates device 12 as containing one shared data application 16 and one data store 18, device 12 can contain any number of shared data applications 16 and data stores 18. Moreover, shared data application 16 and data store 18 need not be located on device 12. They need only be accessible by device 12.

Each device 12 also includes synchronization (sync) engine 20, database 24 and tag generator 26. Sync engine 20 represents generally programming capable of synchronizing records in two or more data stores 18. When contained in given data store 18, each record is stored in a format native to a corresponding shared data application 16. Records in different data stores 18, then can be stored in any number of formats. To synchronize records stored using differing formats, sync engine 20 also includes programming capable of retrieving a record stored in a given format, translating that record into a second format, and modifying or creating second record using the translation. Database 24 contains files for each record in data store 18. The files identify each record within the shared data environment 10 while indicating the status of the record—that is whether the record is new, unchanged, or has been modified or deleted. Tag Generator 26, described in more detail below, represents generally any programming capable of uniquely identifying a record within shared data environment 10.

Figure 3:
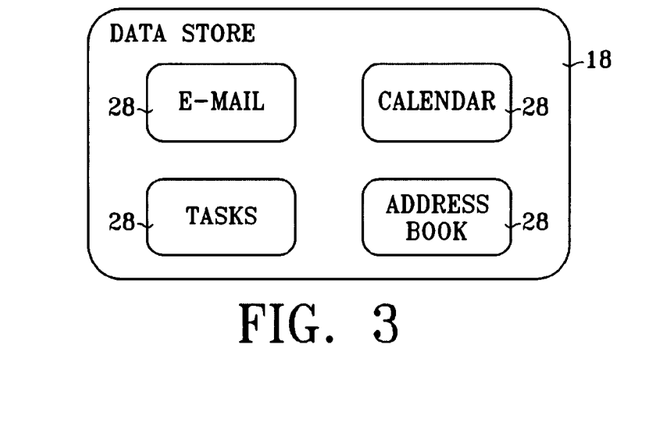
FIG. 3 is a block diagram further illustrating the data store of FIG. 2.
Figure 4:
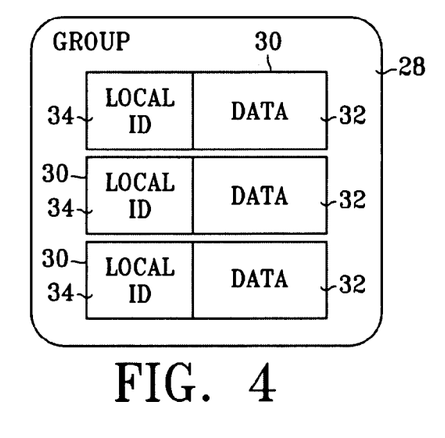
FIG. 4 is a block diagram further illustrating a group from FIG. 3.

FIG. 3 provides an example of a data store 18. Data store 18 includes groups 28. Groups 28 embody logical memory locations for containing records of differing types. In the example of FIG. 3, data store 18 includes e-mail, calendar, task list, and address book groups 28. FIG. 4 provides illustrates the logical components of any given group 28. As shown, group 28 includes three records 30. Each record 30 includes data 32 associated with a local identifier 34. Local identifiers 34 embody electronic data used to identify a particular record 30 within data store 18. Local identifiers 34 are usually created by shared data application 16 when storing a record 30 in data store 18. A local identifier 34 may be something as basic as a file name or other electronic data appended to or associated with a record 30.

Figure 5:
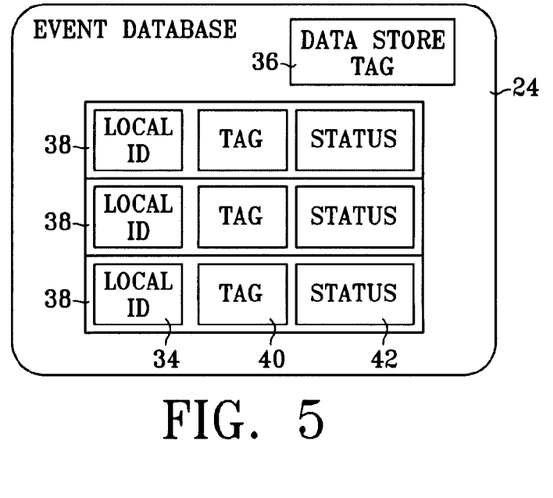
FIG. 5 is a block diagram further illustrating the database of FIG. 2.

FIG. 5 provides an example of the logical components of database 24. Here, database 24 includes data store tag 36 and files 38. Data store tag 36 represents electronic data used to uniquely identify a particular data store 18 within shared data environment 10. Each file 38 includes local identifier 34 record tag 40, and record status 42. Using local identifier 34, other each logical components 40 and 42 of a given file 38 are associated with a particular record 30 within a given data store 18. Record tag 40 represents electronic data uniquely identifying an associated record 30 within shared data environment 10. Record status 42 represents electronic data indicating the status of a given record 30. For example, when a record 30 is first introduced into a data store 18 its status is "new." When a record 30 has been altered, its status is "modified." Other record status indicators include "deleted"0 and "unchanged."

The block diagrams of FIGS. 1–5 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, the invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain the programming of the present invention for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Figure 7:
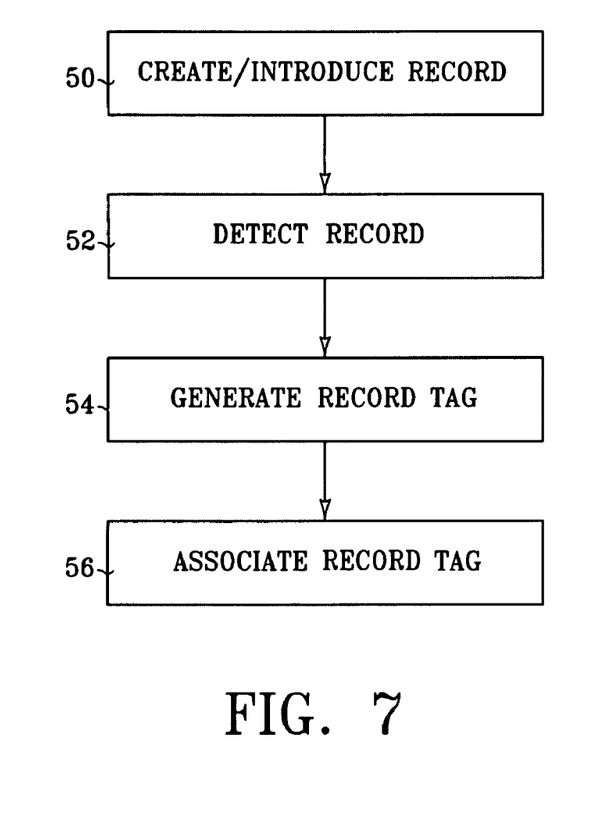
FIG. 7 is a flow chart illustrating the identification of a record new to a shared data environment.
Figure 8:
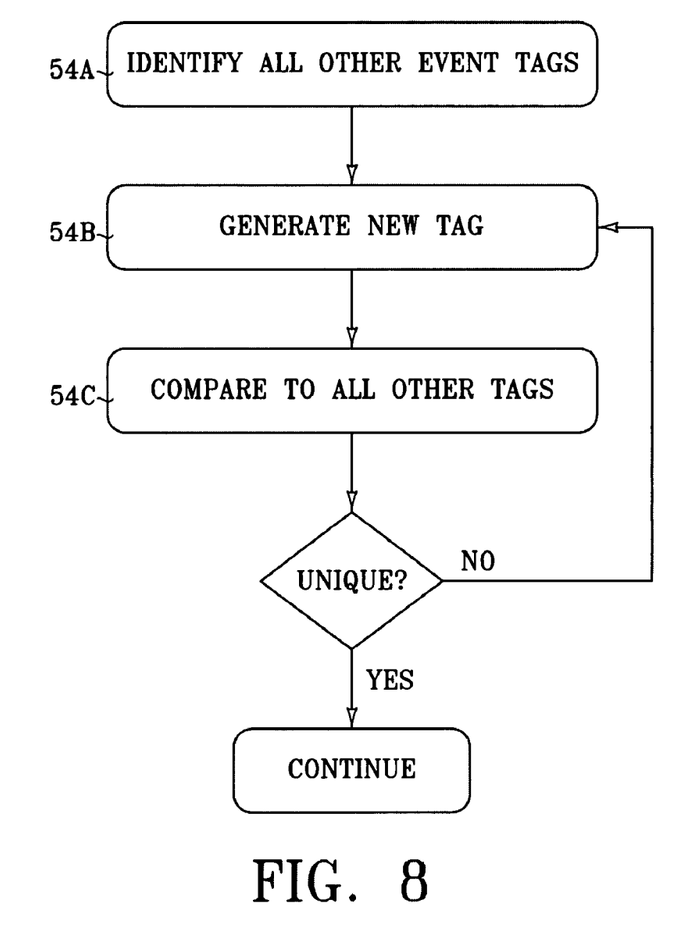
FIGS. 8 and 9 are flow charts each further illustrating the act of generating from FIG. 7.
Figure 9:
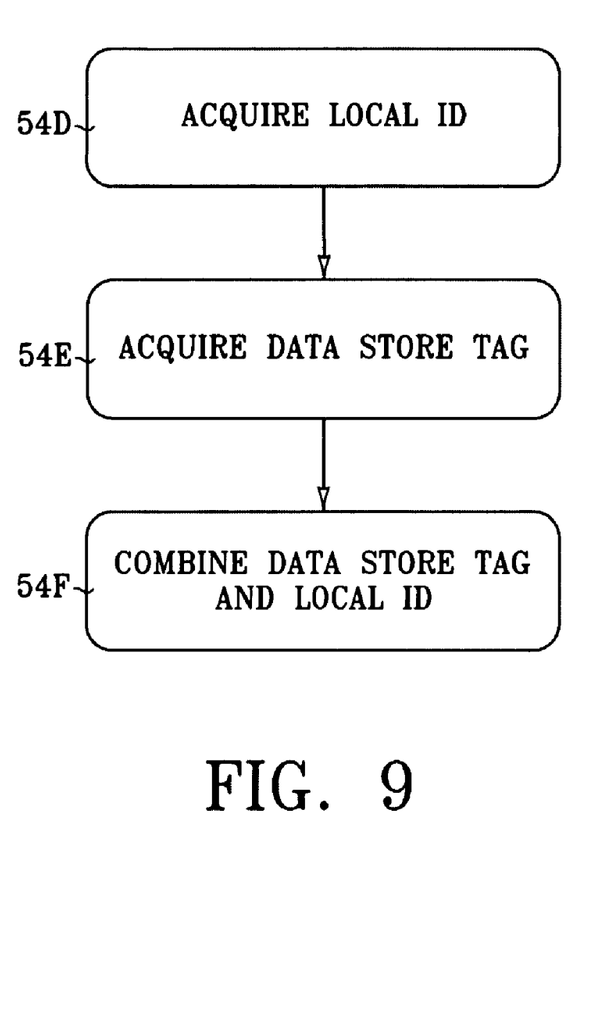
Figure 10:
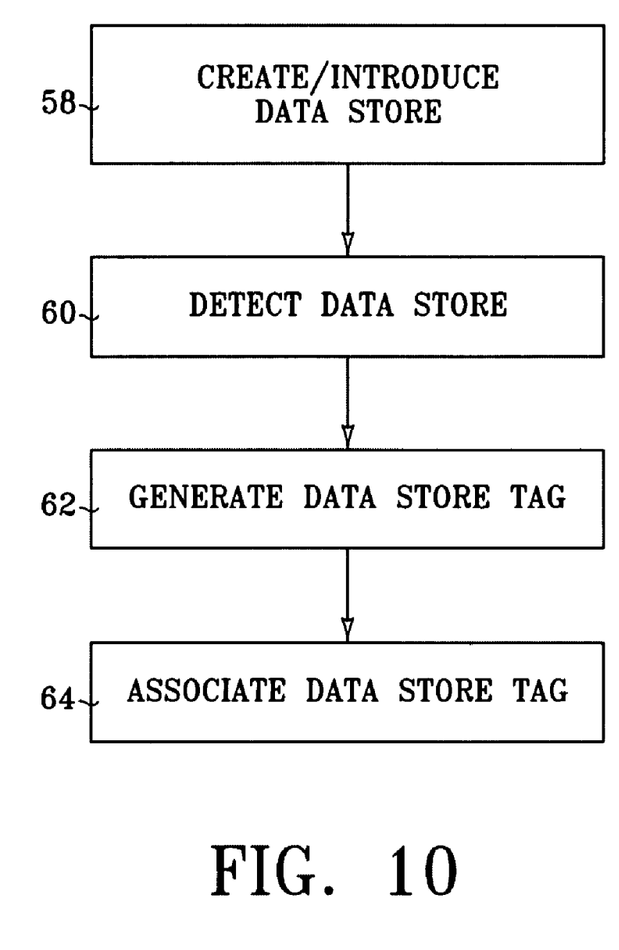
FIG. 10 is a flow chart illustrating the identification of a data store new to a shared data environment.
Figure 11:
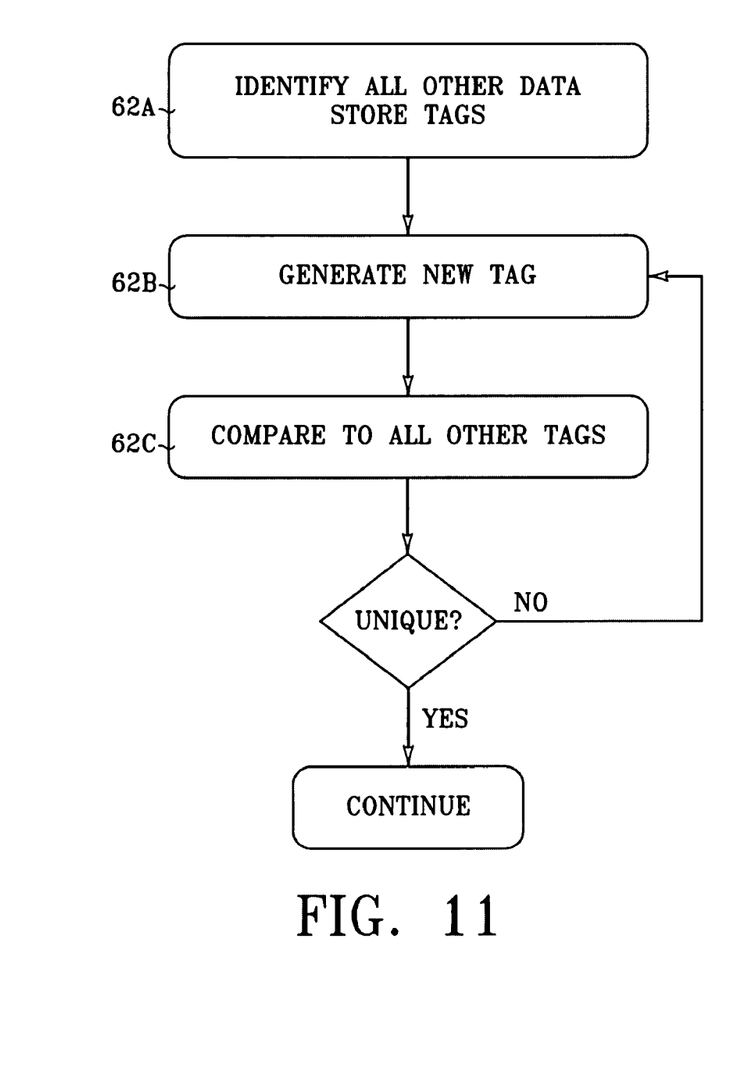
FIG. 11 is a flow chart further illustrating the act of generating from FIG. 10.
Figure 12:
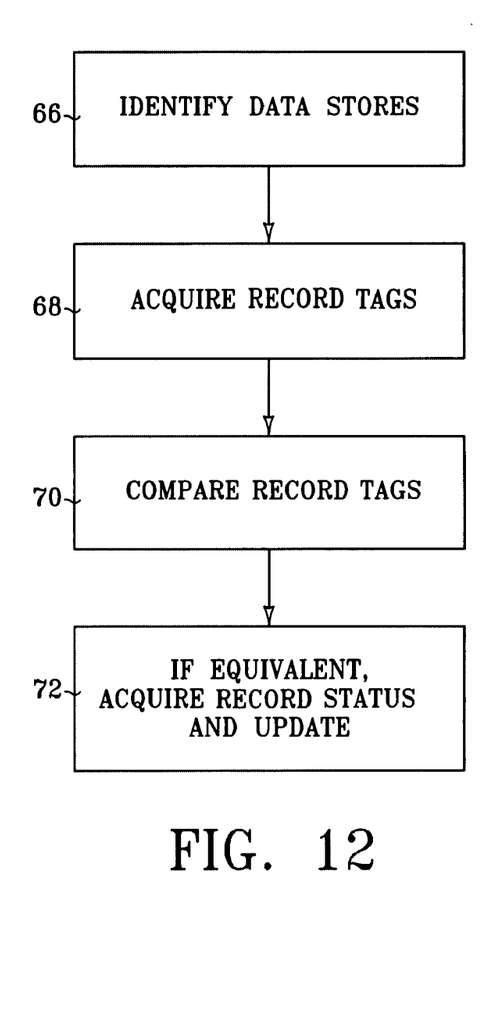
FIG. 12 is a flow chart illustrating synchronization of two data stores.

OPERATION: The operation of sync engine 20 and tag generator 26 will now be described with reference to the block diagram of FIG. 6 and the flow diagrams of FIGS. 7–12. FIGS. 7–9 provide examples of the steps taken to uniquely identify a record 30 within shared data environment 10, while FIGS. 10 and 11 provide examples of uniquely identifying a data store within shared data environment 10. FIG. 12 provides an example of the steps taken to synchronize records 30 contained in two data stores 18 and 18'.

Figure 6:
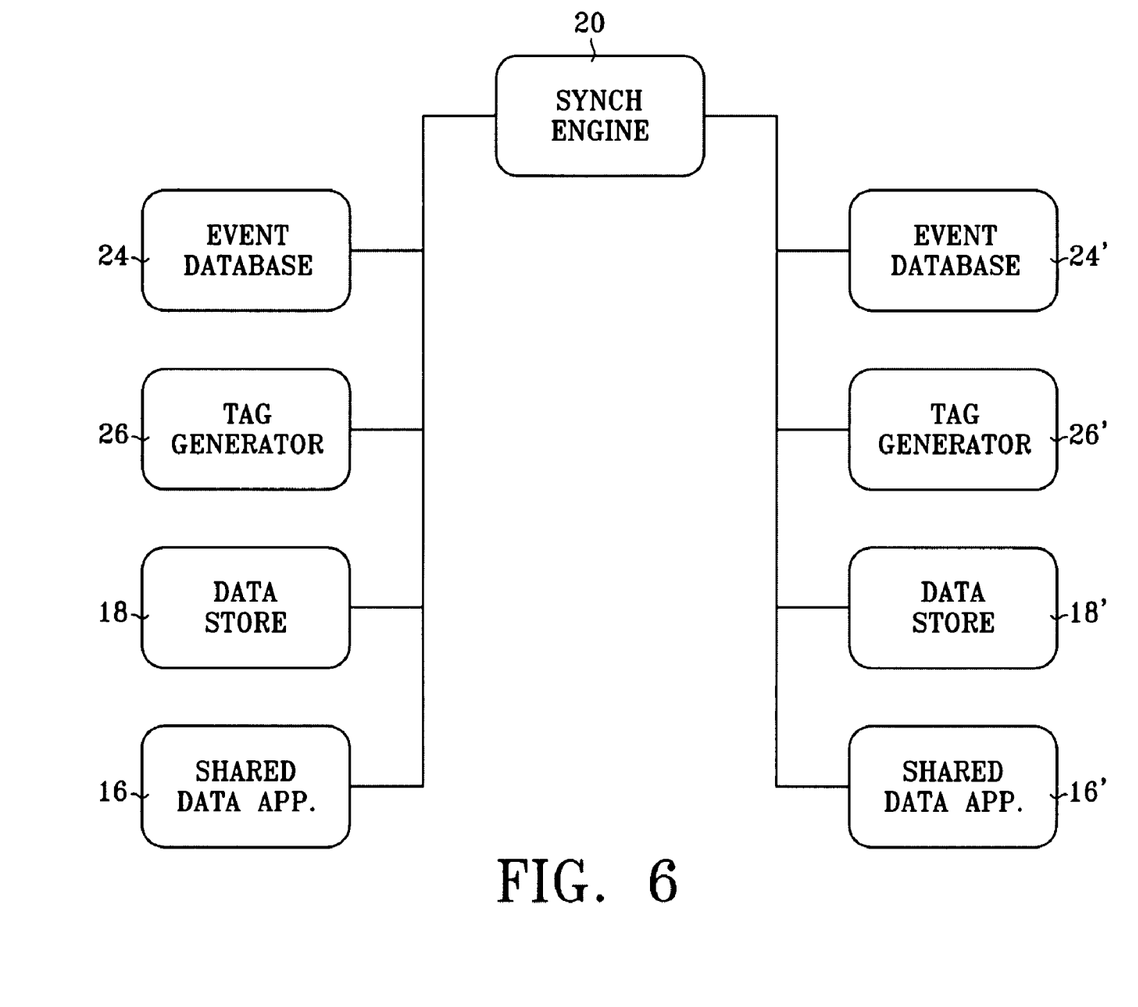
FIG. 6 is a block diagram illustrating a logical communication path between the components of two devices when synchronizing records.

Beginning with FIG. 6, only one sync engine 20 is needed to synchronize records 30 across any number of devices. FIG. 6 illustrates sync engine 20 in communication with databases 24 and 24', tag generators 26 and 26', data stores 18 and 18' and shared data applications 16 and 16'. Referring also now to FIG. 7, one of the shared data applications, 16 in this case, creates and introduces a new record 30 in corresponding data store 18 (step 50). Alternatively, a data store 18 containing new records 30 could be introduced into shared data environment 10. The corresponding tag generator 26 detects the record's introduction (step 52) and generates a record tag 40 unique to shared data environment 10 (step 54). Tag generator 26 then associates the generated record tag 40 with the detected record 30 updating the corresponding datastore 18 or 18' with a file 38 for the new record 30 (step 56).

FIG. 8 illustrates one embodiment of the steps taken to generate a record tag 40 unique to shared data environment 10. Communicating with each database 32, tag generator 26 identifies the record tags 40 and 40' associated with all other records 30 and 30' in shared data environment 10 (step 54A). Tag generator 26 then repeatedly generates a new tag comparing that tag to the other record tags 40 and 40' until the new tag is found to be unique (steps 54B and 540). FIG. 9 provides an alternative example of steps taken to generate a tag in step 54. Tag generator 26 acquires the local identifier 34 for the new record 30 (step 54D) and the data store tag 36 for the data store 18 containing the new record 30 (step 54E). Tag generator 26 then combines or concatenates the acquired data 32 and 36 creating a record tag 40 (step 54F). The embodiment illustrated in FIG. 9 has the benefit of not requiring tag generator 26 to be connected to shared data environment 10 when generating a record tag 40. Because the data store tag 36 is unique to the environment 10, a combination of the data store tag 36 and the local identifier 34 is also unique. Tag generator 26, then, can create a record tag 40 unique to shared data environment 10 while being disconnected from the environment 10.

FIG. 10 illustrates the steps taken to generate a data store tag 36. Typically, a new data store 36 is introduced into shared data environment 10 when either a new device 12 containing a data store is connected to environment 10 or when created by a given shared data application 16 or 16' (step 58). In either case, tag generator 26 in this example detects the introduction of the data store 18 into shared environment 10 (step 60) and generates a data store tag 36 unique to the shared data environment 10 (step 62). Tag generator 26 associates the new data store tag 36 with the new data store 18 (step 64). It is envisioned that tag generator 26 will accomplish step 64 by establishing a database 24 for the new data store 18. As described above, the database 24 will contain the new data store tag 36 and a file 38 for each record 30 found in the new data store 18.

FIG. 11 provides an example of the steps taken to generate a data store tag 36 in step 62 of FIG. 10. Communicating with each database 32 in shared data environment 10, tag generator 26 then identifies the data store tags 36 and 36' associated with all other data stores 18 and 18' in shared data environment 10 (step 62A). Tag generator 26 then repeatedly generates a new data store tag comparing that tag to the other data store tags 36 and 36' until the new tag is found to be unique (steps 62B and 62C).

FIG. 12 illustrates the steps taken to synchronize the two data stores 18 and 18' in FIG. 6. Sync engine 20 identifies data stores 18 and 18' (step 66) and acquires the record tags 40 and 40' from databases 32 and 32' for each record 30 and 30' contained in data stores 18 and 18' (step 68). Sync engine 20 compares each record tag 40 or 40' from one database 32 or 32' with the record tags 40' or 40 the other database 32' or 32 until it finds a match (step 70). Upon finding a match, sync engine 20 acquires and compares the record status 42 and 42' for each record 30 and 30' associated with the matching record tags 40 and 40' and updates the records 30 and 30' accordingly (step 72). It is envisioned that record tags 40 and 40' will be scalar—a programming term referring to a string of letters, numbers, and/or other alphanumeric characters. When comparing scalar record tags 40 and 40', sync engine 20 performs a scalar comparison of the record tags 40 and 40'. In other words, sync engine 20 determines whether a first record tag is equivalent to a second.

The following describes how two records might be updated based upon the record status of each:

Modifying one record 30 to match the second record 30' if the record status 42 for the first record 30 is indicates that the first record 30 is new or unchanged and the record status 42' record for the second record 30' indicates that the second record 30' has been modified. Modifying may also include restoring a deleted record 30 if the record status 42' for the other record 30' indicates that the record 30' has been modified at a time after the first record 30 was deleted.

Deleting one record 30 if the record status 42 for that record 30 is new or unchanged and the record status 42' for the second record 30' indicates that the second record 30 has been deleted. Deleting in this case may include deleting a record 30 if the record status 42 for that record 30 indicates that the record 30 has been modified while the record status 42' for the other record 30' indicates that it has been deleted at a time after the first record 30 was modified; and Modifying each record 30 and 30' in light of the other if the record status 42 and 42' for each indicates that each has been modified.

When a record 30 is new to shared data environment 10, comparing the new record's record tag 40 with the record tags 40' will not reveal a match. In this case sync engine 20 replicates the new record 30 in the other data store 18' and updates the other database 24' with a file 38' for the new record 40'. When finished, each data store 18 and 18' contain identical records 30 and 30' associated with identical record tags 40 and 40'.

Although the flowcharts of FIGS. 7–12 show a specific order of execution, the order of execution may differ from that which is depicted. For example, the order of execution of two or more blocks may be scrambled relative to the order shown. Also, two or more blocks shown in succession in FIGS. 7–12 may be executed concurrently or with partial concurrence. All such variations are within the scope of the present invention. The present invention has been shown and described with reference to the foregoing exemplary embodiments. It is to be understood, however, that other forms, details, and embodiments may be made without departing from the spirit and scope of the invention, which is defined in the following claims.

What is claimed is:

1. A method for distinguishing a record in a shared data environment that includes plural data stores each associated with a different device, comprising:

in a particular one of the data stores, detecting a record new to the shared data environment, the detected record having a local identifier that uniquely identifies and distinguishes the record within the particular data store;

generating a record tag that uniquely identifies the detected record within the shared data environment, the generated record tag being unique in its value, and associating the record tag with the record wherein associating comprises providing a file in a database associated with the particular data store, the file containing the local identifier, the record tag, and a record status, the local identifier associating the provided file with the detected record.

2. The method of claim 1, wherein the act of generating comprises:

identifying all other record tags in the shared data environment; and repeatedly generating a new record tag until the generated record tag is different from each of the other identified record tags.

3. The method of claim 1, wherein the particular data store is associated with a data store tag unique to the shared data environment, and wherein the act of generating comprises:

generating a record tag for the detected record by at least in part combining the local identifier with the data store tag.

4. A computer program product for distinguishing a record in a shared data environment that includes plural data stores each associated with a different device, the product comprising a computer useable medium having computer readable instructions thereon for:

in a particular one of the data stores, detecting a record new to the shared data environment, the detected record having a local identifier that uniquely identifies and distinguishes the record within the particular data store;

generating a record tag that uniquely identifies the detected record within the shared data environment, the generated record tag being unique in its value, and associating the record tag with the record wherein associating comprises providing a file in a database associated with the particular data store, the file containing the local identifier, the record tag, and a record status, the local identifier associating the provided file with the detected record.

5. The computer program product of claim 4, wherein the instructions for generating comprise instructions for:

identifying all other record tags in the shared data environment; and repeatedly generating a new record tag until the generated record tag is different from each of the other identified record tags.

6. The computer program product of claim 4, wherein the particular data store is associated with a data store tag unique to the shared data environment, and wherein the instructions for generating comprise instructions for:

generating a record tag for the detected record by combining the local identifier with the data store tag.

7. A computer program product for synchronizing records in a shared data environment, the product comprising a computer useable medium having computer readable instructions thereon for:

accessing a first database associated with a first data store, the first database containing a first plurality of files each associated with a different record in the first data store, the first plurality of files including a first file containing a first record tag, a first record status, and a first local identifier;

accessing a second database associated with a second data store, the second database containing a second plurality of files each associated with a different record in the second data store, the second plurality of files including a second file containing a second record tag, a second record status and a second local identifier;

acquiring, from the first file, the first record tag, the first record status and the first local identifier;

acquiring, from the second file, the second record tag, the second record status, and the second local identifier;

comparing the first and second record tags; and if the first and second record tags are equivalent, synchronizing a first record from the first data store with a second record from the second data store according to the first and second record statuses, wherein the first record is uniquely identified in the first data store by the first local identifier and the second record is uniquely identified in the second data store by the second local identifier.

8. The computer program product of claim 7, wherein; the instructions for synchronizing comprise instructions for:

modifying the first record to match the second record if the first record status indicates that the first record is new or unchanged and the second record status indicates that the second record has been modified;

deleting the first record if the first record status indicates that the first record is new or unchanged and the second record status indicates that the second record has been deleted;

modifying the second record to match the first record if the second record status indicates that the second record is new or unchanged and the first record status indicates that the first record has been modified; and deleting the second record if the second record status indicates that the second record is new or unchanged and the first record status indicates that the first record has been deleted.

9. The computer program product of claim 7 wherein the record tags are scalar and wherein the instructions for comparing comprise instructions for performing a scalar comparison of the first and second record tags.

10. The computer program product of claim 7 further comprising instructions for:

detecting records new to the environment; and for each detected record, generating a record tag and associating that record tag with the record.

11. The computer program product of claim 10, wherein the instructions for generating comprise instructions for:

identifying all other record tags in the shared data environment; and repeatedly generating a new record tag until the generated record tag is different from each of the other identified record tags.

12. The computer program product of claim 10, wherein the shared data environment includes two or more data stores and each record in the shared data environment is contained within one of the data stores and is associated with a local identifier unique to the data store in which the record is contained, each shared data store being associated with a data store tag that is unique to the shared data environment, and wherein the instructions for generating comprise instructions for:

generating a record tag for the detected record by combining the local identifier for the detected record with the data store tag for the data store containing the detected record.

13. The computer program product of claim 12, further comprising instructions for:

detecting data stores new to the shared data environment; and for each detected data store, generating a data store tag that is unique to the shared data environment and associating the generated tag with the data store.

14. The computer program product of claim 13, wherein the instructions for generating a data store tag comprise instructions for:

identifying all other data store tags in the shared data environment; and repeatedly generating a new data store tag until the generated tag is different from each of the other identified data store tags.

15. A method for synchronizing records in a shared data environment, comprising:

providing a first database associated with a first data store, the first database containing a first plurality of files each associated with a different record in the first data store, the first plurality of files including a first file containing a first record tag, a first record status, and a first local identifier;

providing a second database associated with a second data store, the second database containing a second plurality of files each associated with a different record in the second data store, the second plurality of files including a second file containing a second record tag, a second record status and a second local identifier;

acquiring, from the first file, the first record tag, the first record status and the first local identifier;

acquiring, from the second file, the second record tag, the second record status, and the second local identifier;

comparing the first and second record tags; and if the first and second record tags are equivalent, synchronizing a first record from the first data store with a second record from the second data store according to the first and second record statuses, wherein the first record is uniquely identified in the first data store by the first local identifier and the second record is uniquely identified in the second data store by the second local identifier.

16. The method of claim 15, wherein;

the act of synchronizing comprises:

modifying the first record to match the second record if the first record status indicates that the first record is new or unchanged and the second record status indicates that the second record has been modified;

deleting the first record if the first record status indicates that the first record is new or unchanged and the second record status indicates that the second record has been deleted;

modifying the second record to match the first record if the second record status indicates that the second record is new or unchanged and the first record status indicates that the first record has been modified; and deleting the second record if the second record status indicates that the second record is new or unchanged and the first record status indicates that the first record has been deleted.

17. The method of claim 15 wherein the record tags are scalar and the act of comparing comprises performing a scalar comparison of the first and second record tags.

18. The method of claim 15 further comprising:

detecting records new to the environment; and for each detected record, generating a record tag and associating that record tag with the record.

19. The method of claim 18, wherein the act of generating comprises:

identifying all other record tags in the shared data environment; and repeatedly generating a new record tag until the generated record tag is different from each of the other identified record tags.

20. The method of claim 18, wherein the shared data environment includes two or more data stores and each record in the shared data environment is contained within one of the data stores and is associated with a local identifier unique to the data store in which the record is contained, each shared data store being associated with a data store tag that is unique to the shared data environment, and wherein the act of generating comprises:

generating a record tag for the detected record by combining the local identifier for the detected record with the data store tag for the data store containing the detected record.

21. The method of claim 20, further comprising:

detecting data stores new to the shared data environment; and for each detected data store, generating a data store tag that is unique to the shared data environment and associating the generated tag with the data store.

22. The method of claim 21, wherein the act of generating a data store tag comprises:

identifying all other data store tags in the shared data environment; and repeatedly generating a new data store tag until the generated tag is different from each of the other identified data store tags.

23. A system for synchronizing records in a shared data environment, comprising:

a first database associated with a first data store, the first database containing a first plurality of files each associated with a different record in the first data store, the first plurality of files including a first file containing a first record tag, a first record status, and a first local identifier;

a second database associated with a second data store, the second database containing a second plurality of files each associated with a different record in the second data store, the second plurality of files including a second file containing a second record tag, a second record status and a second local identifier;

a single synch engine operable to compare the first and second record tags of the first and second files and, if the first and second record tags are equivalent, to synchronize a first record associated with the first file with a second record associated with the second file according to the first and second record statuses, wherein the first record is uniquely identified in the first data store by a first local identifier from the first file and the second record is uniquely identified in the second data store by a second local identifier from the second file.

24. The system of claim 23, wherein the synch engine is operable to:

modify the first record to match the second record if the first record status indicates that the first record is new or unchanged and the second record status indicates that the second record has been modified;

delete the first record if the first record status indicates that the first record is new or unchanged and the second record status indicates that the second record has been deleted;

modify the second record to match the first record if the second record status indicates that the second record is new or unchanged and the first record status indicates that the first record has been modified; and delete the second record if the second record status indicates that the second record is new or unchanged and the first record status indicates that the first record has been deleted.

25. The system of claim 23 wherein the record tags are scalar and the synch engine is operable to perform a scalar comparison on the first and second record tags.

26. The system of claim 23 further comprising:

a record detector operable to detect records new to the shared data environment, each detected record having a local identifier that uniquely identifies and distinguishes the record within a data store containing the record; and a tag generator in communication with the record detector, the tag generator operable to generate a record tag for the detected record, the record tag uniquely identifying the detected record within the shared data environment, and associate the generated record tag with the detected record.

27. The system of claim 26, wherein the tag generator is operable to identify all other record tags in the shared data environment and to repeatedly generate a new record tag until that generated record tag is different from each of the other identified record tags.

28. The system of claim 26 wherein each record in the shared data environment is contained in a data store, the system further comprising:

a data store detector operable to detect data stores new to the shared data environment; and wherein the tag generator is further operable, for each detected data store, to generate a data store tag and to associate the generated tag with the detected data store.

29. The system of claim 28, wherein the tag generator is operable to identify all other data store tags in the shared data environment and to repeatedly generate a new data store tag until that generated tag is different from each of the other identified data store tags.

30. The system of claim 28, wherein each record in a given data store is associated with a local identifier that uniquely identifies that record within the given data store and wherein the tag generator is operable, for each detected record, to combine the local identifier for that detected record with the data store tag for the data store containing that detected record to generate the record tag.

\* \* \* \* \*